United States Patent Office.

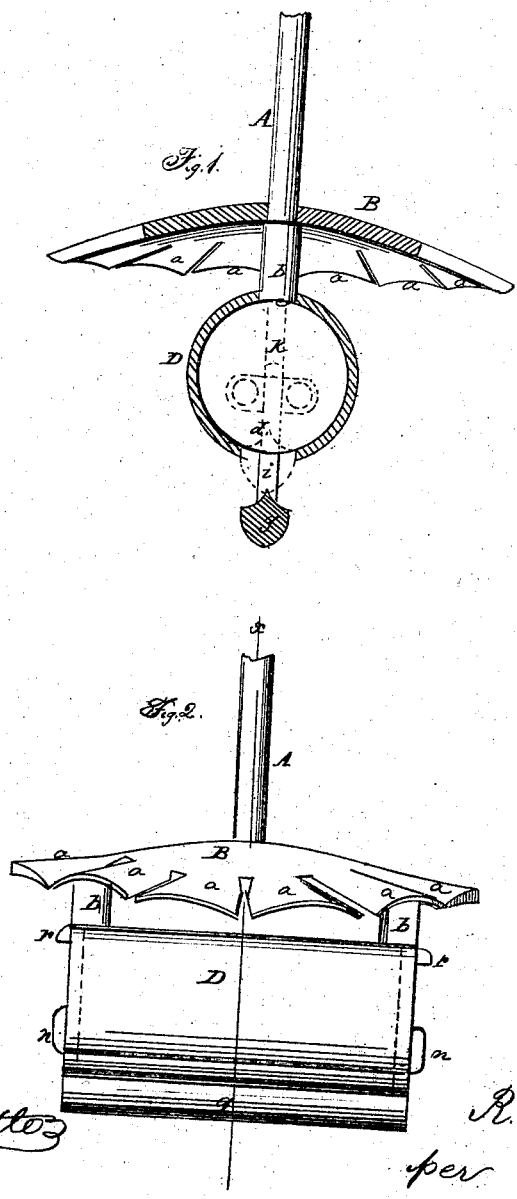

ROBERT CRAWFORD, OF MERCER, PENNSYLVANIA.

Letters Patent No. 74,995, dated March 3, 1868.

IMPROVEMENT IN CHURN-DASHERS.

The Schedule referred to in these Letters Patent and making part of the same.

TO ALL WHOM IT MAY CONCERN:

Be it known that I, ROBERT CRAWFORD, of Mercer, in the county of Mercer, and State of Pennsylvania, have invented a new and useful Improvement in Churn-Dashers; and I do hereby declare that the following is a full, clear, and exact description thereof, which will enable those skilled in the art to make and use the same, reference being had to the accompanying drawings forming part of this specification.

Figure 1 is a cross-section, through $x$ $x$, of my improved dasher.

Figure 2 is a side view of the same.

Similar letters of reference indicate corresponding parts.

This invention consists in attaching an air-vessel to and underneath the dasher-disk of a churn, together with other devices, perfecting the whole, as will hereinafter be more fully set forth.

In the drawings, A is the ordinary shaft or handle of a churn-dasher. B is a concave disk, as shown, with radial concave wings, $a$. Below the disk B, and affixed firmly thereto by connections, as shown at $b$, or any other suitable device, is the air-vessel D, which may be cylindrical, as shown, or of any form found most desirable. This air-vessel is open at its top and bottom, as shown at $e$ and $d$. In the drawing, the upper opening, $d$, extends lengthwise of the air-vessel, between the connections $b$. The area of the bottom opening, $d$, is greater than that of $e$, for a purpose to be shown. The bottom opening, $d$, is provided with a valve, $g$, which is suspended at its ends by rods $i$, which latter terminate in nibs $r$. These rods $i$ work loosely in grooves $k$, in the exterior of the ends of the air-vessel, and a cross-bar, $n$, crossing the groove, as shown by the dotted lines in fig. 1, prevents the nibs $r$ from passing, thereby keeping the valve attached to the vessel in the proper position. The grooves serve as guides to conduct the valve $g$ to its seat.

The object of this valve is to close the lower opening of the air-vessel when the dasher descends upon the cream, and to fall away from said opening when the dasher is raised. The valve may be of any suitable shape, nothing being claimed in the form thereof.

The operation of this invention may now be shown. When the dasher descends, the valve $g$, striking upon the surface of the cream, closes the lower opening of the air-vessel, and as the said vessel descends into the cream, the latter pours into the vessel through the opening $d$, and the air escaping therefrom, is brought immediately in contact with the particles of the cream, whereby the air is more thoroughly commingled with the cream, and the latter becomes rapidly oxygenized, which is the condition constituting butter. When the dasher is raised the valve falls away from the vessel, and the body of the cream within passes easily out, thereby permitting the dasher to be worked with ease. The lower opening is therefore made considerably larger than the upper opening as before stated. The concave radial arms of the dasher-disk assist in conducting the cream to the upper opening, and holding it against the escaping air, which thereby causes much bubbling and agitation, which produce the aerating effect before described.

This dasher has been proved, by practical use daily, to accomplish the formation of butter in a rapid and effective manner. It is simple, of small cost, and can be directly applied to any of the vertically-acting dasher-churns now in use.

Having thus described my invention, I claim as new, and desire to secure by Letters Patent—

1. The air-vessel D, of any suitable shape, for the purpose of displacing the cream and permitting the same to pour into the said vessel, thereby commingling with the air in the vessel, substantially as shown and described, and for the purpose specified.

2. The valve $g$, of any suitable form, in combination with an air-vessel, D, and operating substantially as shown and described, and for the purpose specified.

3. The concave radial wings $a$, in combination with the air-vessel D, substantially as and for the purpose shown and described.

The above specification of my invention signed by me, this thirtieth day of December, 1867.

ROBT. CRAWFORD.

Witnesses:
 JOSEPH BLECK,
 W. A. MCCORMICK.